(12) United States Patent
Berg et al.

(10) Patent No.: US 6,975,560 B2
(45) Date of Patent: Dec. 13, 2005

(54) GEOPHYSICAL METHOD AND APPARATUS

(75) Inventors: Eivind W. Berg, Ranheim (NO); Scott T. Michell, Houston, TX (US); Nigel P. Purnell, Sugar Land, TX (US); Graham Openshaw, Houston, TX (US); Atle H. Fyhn, Jakobsli (NO); Gerard J. Beaudoin, Houston, TX (US)

(73) Assignee: BP Corporation North America Inc., Warrenville, IL (US)

( * ) Notice: Subject to any disclaimer, the term of this patent is extended or adjusted under 35 U.S.C. 154(b) by 186 days.

(21) Appl. No.: 10/396,009

(22) Filed: Mar. 25, 2003

(65) Prior Publication Data

US 2003/0218937 A1 Nov. 27, 2003

Related U.S. Application Data

(60) Provisional application No. 60/367,817, filed on Mar. 27, 2002.

(51) Int. Cl.[7] .............................................. G01V 1/38
(52) U.S. Cl. ........................ 367/16; 367/15; 367/133
(58) Field of Search ........................... 367/15, 16, 133; 114/321; 405/154.1

(56) References Cited

U.S. PATENT DOCUMENTS

| | | | | |
|---|---|---|---|---|
| 5,189,642 | A | | 2/1993 | Donoho et al. ................ 367/15 |
| 5,442,590 | A | * | 8/1995 | Svenning et al. ............. 367/15 |
| 6,456,565 | B1 | * | 9/2002 | Grall et al. .................... 367/18 |
| 6,588,980 | B2 | * | 7/2003 | Worman et al. ............ 405/158 |
| 6,657,921 | B1 | * | 12/2003 | Ambs .......................... 367/20 |

FOREIGN PATENT DOCUMENTS

| | | |
|---|---|---|
| EP | 0173477 A2 | 10/2001 |
| EP | 0173477 A3 | 10/2001 |
| EP | 0184184 A2 | 11/2001 |
| EP | 0184184 A3 | 11/2001 |
| WO | WO 01/73477 A2 * | 10/2001 ............ G01V 1/38 |
| WO | WO 02/46793 A1 * | 6/2002 ............ G01V 1/00 |

OTHER PUBLICATIONS

Javling, Bjorn. "Depth accuracy in seabed mapping with underwater vehicles." Norweigen Defense Researchg Establishment.*

Dawe, T.C. et al., *Subsea Instrument Deployments; Methodology and Techniques Using a Work Class Remotely Operated Vehicle (ROV)*, Sep. 28, 1998, Oceans '98 Conference Proceedings Nice, France, pp. 1589-1593.

Kasahara, J. et al., *Installation of High Precision Selsmometer Unit At The Ryukyu Trench Using Guam-Okinawa Geophysical Submarine Cable (GOGC: Fomer TPC-2 Cable)*, May 23-26, 2000, International Symposium on Underwater Technology, Proceedings, Tokyo, Japan, pp. 369-373.

* cited by examiner

Primary Examiner—Bernarr E. Gregory
Assistant Examiner—Scott A. Hughes
(74) Attorney, Agent, or Firm—James A. Gabala (57) ABSTRACT

A method and apparatus is disclosed for performing a seismic survey below the surface of a body of water and on the seabed. In one embodiment, a plurality of seismic data receivers are removably loaded in a carrier located above the surface of the water and the carrier is lowered into the water and placed at a depth relatively close to the seabed. Each of the receivers has a memory for recording the vibrations of the seabed and has a switch for activating the memory. A ROV is used to unload the receivers from the carrier and to deposit each receiver on the seabed and along a survey line. In one embodiment, the receivers comprise a frame, a pressure vessel for housing the memory and remotely activated controls, and a geophone that is separately planted into the seabed at a relatively short distance from the frame.

9 Claims, 7 Drawing Sheets

GEOPHYSICAL METHOD AND APPARATUS

CROSS-REFERENCE TO RELATED APPLICATIONS

This application claims the benefit of the filing date of U.S. Provisional Patent Application Ser. No. 60/367,817 filed on Mar. 27, 2002 which disclosure is incorporated herein by reference.

TECHNICAL FIELD

This invention relates to the general subject of methods and apparatus used to explore for oil and gas and, in particular, to methods using equipment that is deposited on the seabed to record seismic data.

STATEMENT REGARDING FEDERALLY-SPONSORED RESEARCH OR DEVELOPMENT

Not applicable

REFERENCE TO A "MICROFICHE APPENDIX"

Not applicable

BACKGROUND OF THE INVENTION

Offshore oil production has only moved into the very deep waters in recent years. Most seismic surveys in deep water have been carried out with seismic cables towed behind a vessel of opportunity. Newer seismic techniques lay relatively short cables on the sea floor having a total length of only 3 to 6 kilometers. Some seismic techniques require permanently installing seismic arrays on the sea floor to monitor the depletion of deepwater hydrocarbon reservoirs.

Ocean bottom cable technology utilizes acoustic detectors that are deployed at fixed locations at or near the ocean bottom. An acoustic source is towed near the ocean surface, and it imparts acoustic energy into the water that is reflected from geological strata and interfaces below the ocean bottom and that is measured by the acoustic detectors. The measured signals are, as typical in the seismic prospecting field, indicative of the depth and location of the reflecting geological features.

Typically, the ocean bottom detectors include both a geophone and a hydrophone, for recording both pressure and velocity information. This dual-sensor approach can help eliminate ghost and reverberation effects.

Ocean bottom cable detectors are often advantageous, as compared to towed detectors, in performing surveys in crowded offshore regions, such as may be encountered near offshore drilling and production platforms (which are often present, of course, near hydrocarbon reserves). The cost of each pass of the source vessel through the survey region is also relatively low when using ocean bottom detector cables, considering that the source vessel does not need to tow hydrophone streamers.

Figure 1:
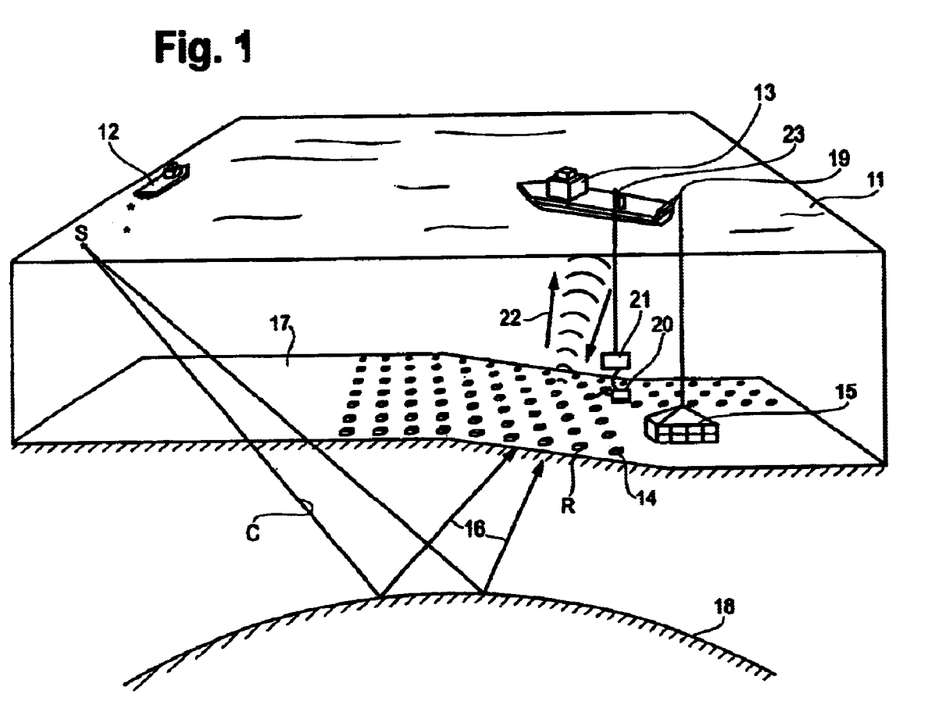
FIG. 1 is a schematic view of seismic operations in ultra deep waters showing: (i) deployment of autonomous receiver units using the carrier system that is the subject of the present invention, and (ii) a seismic shot generated in the water at its surface producing PP and PS waves that are acquired in the seismic receivers at the seabottom.

In seismic exploration over a body of water 11 (see FIG. 1), a seismic survey ship 12 is equipped with an energy source S for taking seismic profiles of a subsea underground structure. The act of taking profiles is often referred to as "shooting" due to the fact that explosive devices have been commonly used for many years as energy sources. The energy source is designed to produce compressional waves that propagate through the water to the seabed 17 and into the underwater formation. As the compressional waves C propagate through the subsurface, they strike interfaces 18 between formations, commonly referred to as strata, and reflect back through the earth and water to a receiver R. The receiver typically converts the received waves into electrical signals which are then processed into an image that provides information about the structure of the subterranean formation. FIG. 1 shows receivers R on the seabed 17.

One of the most common energy sources S is an air gun that discharges air under very high pressure into the water. The discharged air forms a pulse which contains frequencies within the seismic bandwidth.

Another energy source which is frequently used is a marine vibrator. Marine vibrators typically include a pneumatic or hydraulic actuator that causes an acoustic piston to vibrate at a range of selected frequencies. The vibrations of the acoustic vibrator produce pressure differentials in the water which generate seismic pulses free from spurious bubbles.

Receivers R having hydrophones convert pressure waves into electrical signals that are used for analogue or digital processing. The most common type of hydrophone includes a piezoelectric element which converts physical signals, such as pressure, into electrical signals.

In bottom-cable seismic recording, a combination of pressure sensitive transducers, such as hydrophones, and particle velocity transducers, such as geophones are deployed on the sea bottom 17.

While geophones are typically used in land operations where metal spikes anchor the geophones to the ground to ensure fidelity of geophone motion to ground motion, geophones cannot be economically anchored in marine applications. Therefore, cylindrical, gimballed geophones are attached to the bottom-cable. After the cable is deployed from the seismic survey ship, the geophones simply lie in contact with the marine bottom 17 where they fell. The gimbal mechanism inside the cylinder assures that the geophone element mounted therein is oriented vertically for proper operation.

It is clear from the foregoing discussion that a variety of seismic equipment and techniques may be used in an attempt to accurately plot the subsea underground formation. Regardless of which technique or combination of equipment is used, each offers certain advantages and disadvantages when compared to one another. For instance, gathering seismic data with a towed streamer in areas populated with numerous obstacles, such as drilling and production platforms, can be difficult or even impossible because the streamer may strike one of the obstacles and tear loose from the towing vessel. Such an event represents an extremely costly loss.

By way of further background information, separation of pressure (compressional or P) wave and shear (or S) wave components by signal processing techniques is known. An example of such separation is described in Kendall, et al., "Noise analysis, using a multi-component surface seismic test spread", presented at the 63rd Annual Meeting of the Society of Exploration Geophysicists (1993). This approach performs multi-component rotation analysis at individual receiver positions for each in a series of ray emergence angles, until one is found that maximizes the energy for P and S waves simultaneously.

A remotely operated vehicle (ROV) is a robotic tool 20 for performing underwater work. Many underwater operations (such as drilling and production of oil and gas, installation and maintenance of offshore structures, laying and maintaining underwater pipelines, etc.) require the use of an ROV or robotic tooling.

The deployment of an ROV is typically achieved by launching the unit from a floating host platform 13, a dynamically positioned marine vessel or ship dedicated, specifically for the purpose of supporting an ROV (e.g., an ROV support vessel or "RSV"), or any such surface vessel with sufficient size and characteristics that provide a suitably stable platform for the launching and recovery of an ROV.

Operations of an ROV are limited according to the distance that the ROV can travel from the host platform 13 as well as by restrictions in operating periods due to the collateral activities of the host platform.

In the case of dedicated vessel deployment, such as an RSV, significant costs are associated with operation of a fully founded marine vessel and its mobilization to and from the ROV work site. Typically, a dedicated RSV may have a crew of twenty and a considerable cost not directly related to the operation of the ROV.

ROV operation and monitoring is controlled from the host platform 13 or RSV by means of an umbilical line between the host platform or RSV and the ROV. The operational distance of the ROV is directly related to the length of the umbilical line. That line often includes a control container 21 or Tether Management System.

Therefore, the deeper the water, the longer it takes an ROV to travel from the surface to the bottom. Moreover, the power supply of the ROV is limited. When the ROV has to make many trips to the seafloor, it means that the ROV, relatively speaking, wastes more energy travelling from the surface 11 to the sea bottom 17 than it expends in doing useful work. Relatively speaking, the crew of the ship spends more time waiting for work than doing useful work. Clearly, work on the seafloor at deep depths means more expense overall.

This problem has existed for some time. Considerable effort has been made, and significant amounts of money have been expended, to resolve this problem. In spite of this, the problem still exists. Actually, the problem has become aggravated with the passage of time because oil and gas are now being found in deeper and deeper parts of the world's oceans.

SUMMARY OF THE INVENTION

In accordance with the present invention, a method and apparatus is disclosed for performing seismic survey on the seabed. In one embodiment, the method of the invention is performed by first loading several autonomous ocean bottom seismic data receivers in a cage-like carrier located on the deck of a ship on the surface of the water. Each of the receivers has a memory for recording the vibrations of the seabed and has a switch for remotely activating the memory. Next, the carrier is lowered into the water and placed at a depth relatively close to the seabed. A miniature submarine or remotely operated vehicle (ROV) is used to unload the receivers from the carrier and to deposit each receiver on the seabed and its seismic sensor along a survey line. After the seismic sensors are positioned, a source of sound energy is placed in the water, and a signal is transmitted into the water to operate a switch in the data receivers to activate the memories to begin recording, through the sensor, the response of the seabed to the source. In one embodiment, the receiver units comprise a frame, pressure vessels for housing the memory, a sensor connected by a cable to the memory, controls and a power supply, and a coupling for connecting to an arm extending from a ROV.

The invention provides an improved and more efficient method and apparatus for performing a seismic survey on the seabed. The invention provides a means for deploying seismic receivers on the seabed much quicker than with previous methods. The invention also provides a superior method for planting self-contained OBS units on the seabed while taking maximum advantage of the limited power available for running the units. Numerous other advantages and features of the present invention will become readily apparent from the following detailed description of the invention, the embodiments described therein, from the claims, and from the accompanying drawings.

DETAILED DESCRIPTION

While this invention is susceptible of embodiment in many different forms, there is shown in the drawings, and will herein be described in detail, several specific embodiments of the invention. It should be understood, however, that the present disclosure is to be considered an exemplification of the principles of the invention and is not intended to limit the invention to any specific embodiment so described.

Before describing the invention in detail, the environment of the invention will be explained.

A. Surface Vessels

Two or three vessels (see FIG. 1) can be used in the operation, depending on the number of seismic receiver units needed for the survey. Three different options, with regard to a number of vessels in operation, are suggested.

With a three vessel operation, two receiver handling vessels 13 and one source vessel 12, there will be sufficient time for one of the handling vessels to perform quality control (QC) on the receiver units during operation. The two vessels will also be able to carry all the receiver units onboard prior and after the survey.

With a two vessel operation, one handling vessel 13 and one source vessel 12, there will be limited time for QC of the units. With 450 units, an average sized handling vessel may have to make one extra trip to port to pick up additional receiver units.

The third option is also a two-vessel operation: one source vessel 12 and one Dynamic Positioning (DP) ROV support vessel 13 or RSV. The support vessel 13 will deploy and recover the receiver units by use of an ROV. In one large-scale deployment, this option was the most cost efficient method (i.e., no vessel will be idle for any substantial period during the survey). Source vessels with this capacity are not that common today. However, the following ship owners in the Gulf of Mexico (GOM) have suitable vessels: Stolt Commex; Canyon Offshore; and Fugro Geoteam.

1. Source Vessel

A typical vessel 12 for this type of operation has a dual source array for flip-flop shooting. Each array consists of three gun strings with a combined capacity of greater than 100 bar-meter in source strength. Ideally the source should create an impulse of omni-directional signature within the frequencies considered. The selection of source vessels is somewhat limited. Usually 3D seismic vessels are the only ones with sufficient air compressor capacity for operating the guns.

2. Dynamic Positioned ROV Vessel

Figure 2:
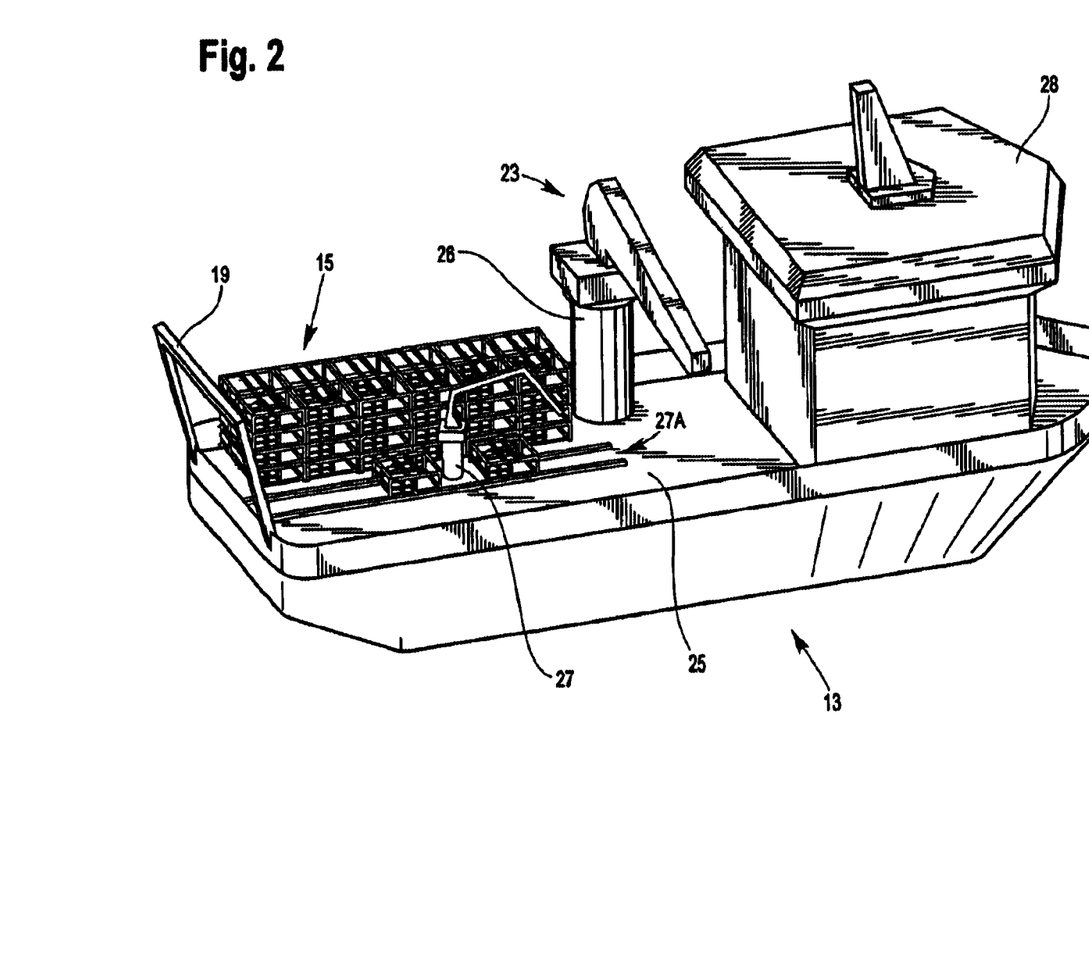
FIG. 2 is a perspective view of a ROV support vessel showing deck handling of seismic receiver units.

A DP/ROV vessel 13 is depicted in FIG. 3. Such a vessel has a pilot house 28 close to the bow and a large open deck 25 at its stern. A large open deck is preferred for the efficient deployment and recovery of the ROV and the seismic receiver units 14 during the survey. A large deck space allows for a large quantity of carriers 15 and for safe access. The OBS unit handling area on the deck should be arranged for effective operation and safety for personnel and equipment. In FIG. 2, the carriers are shown stacked in several rows. All deck equipment is preferably radio or remote controlled to ensure that equipment operators can position themselves for best possible viewing. The vessel 13 has equipment for hydro acoustic communication 22 (see FIG. 1) with the seismic receiver units 14 through the water.

Deck Handling Equipment

A carrier operating crane 19, at the rear end of the deck space 25, is available for deployment and recovery of the carriers 15. A deck service crane 27 is used to bring stacked carriers 15 to the handling area of the carrier crane 19. A ROV launch and recovery crane 23 is mounted on a column 26 at the forward end of the deck space 25. A deck service crane 27 is movable on a pair of rails 27A arranged longitudinally on the deck space 25. The carrier crane 19 may be a heave compensated A-frame boom with a winch. Some working examples are:

A-Frame, 10 ton (T) safe working load (SWL), 4 m Outreach, Dedicated to OBS units, Radio operated.
  Winch, Capacity 4000 m, 15 mm wire/rope, Spooling device, Max speed 200 m/min.
  Main Crane, 3 T at 15 m, Radio operated.
  Auxiliary crane, 1.5 T at 6 m, Radio operated.
  ROV Equipment
  Typical ROV: Triton XL/ZX or HiROV 3000 MK 11, rated to 3000 m.
    Standard equipment:
    Low Light Camera
    Rate-Gyro w/Fluxgate Color Zoom Camera
    Color Mini Camera
    Obstacle Avoidance Sonar
    Hydraulic Pan and Tilt unit
    Hydraulic Tilt unit
    250 W Lights
    Variable Intensity Function Grabber
    Function Manipulator
    Emergency Beacon
    Special tool for OBS sensor positioning and planting.
  Additional ROV related equipment for ROV vessel:
  Control container module, located on the main deck 25, for housing power distribution, control consoles and video suites.
  Workshop container module, located on the main deck 25, for housing extensive spares, consumables, tools, manuals and test equipment.
  Winch, self contained steel construction, with integrated power pack having a line pull of 12 Tons, speed 70 m/min, and 3000 m of 35 mm diameter umbilical.
  High pressure jet washer to clean recovered equipment.
  Electric and fiber optic slip rings.
  Heave-compensated A-Frame hydraulic drive with umbilical sheave and damped snubber.
  15 T SWL, 4 m outreach at sea state six.
  Tether Management System (TMS) 21, Top-hat style with winch and level wind 3000 m depth-rated, 400 m tether capacity camera, lights, and slip rings.

B. OBS Carriers

Figure 3A:
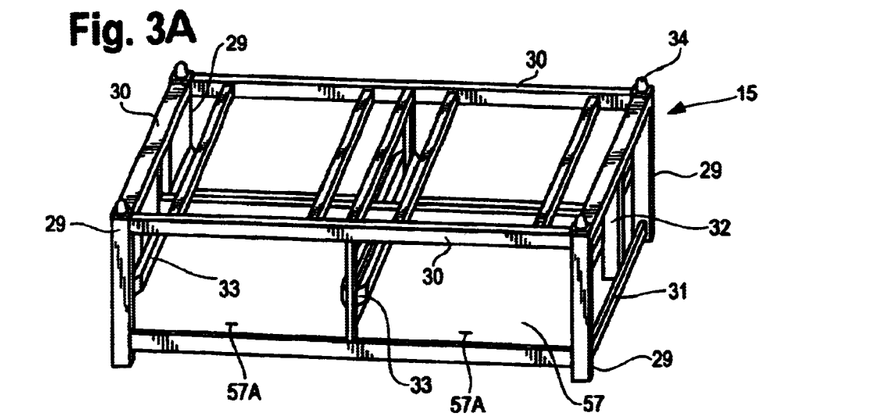
FIGS. 3A and 3B are perspective views of one embodiment of the deployment basket or receiver carrier.
Figure 3B:
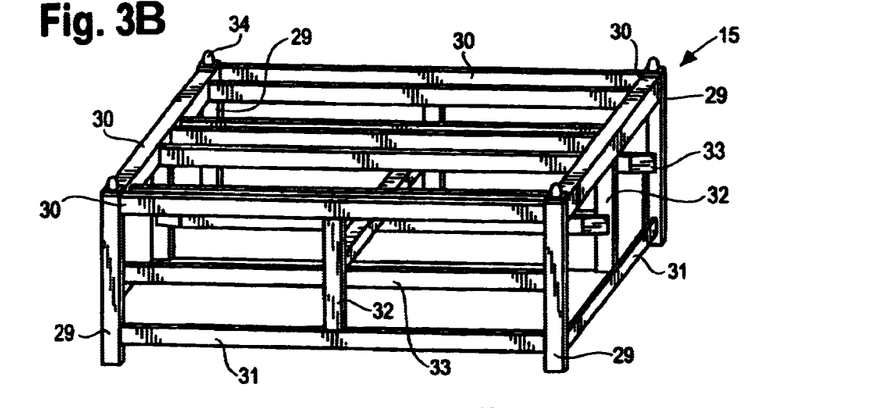

Seismic receiver units (also referred to as "Ocean Bottom Seismic" (OBS) units 14) are stored in strong, light weight, generally open carriers 15 (alternately referred to as "deploy baskets"). One elementary carrier 15 is shown in FIGS. 3A and 3B. Typically, four to sixteen receiver units 14 can be removably accommodated in each carrier (see FIG. 4) depending on its dimensions and strength and the capacity of the support vessel.

Referring to FIGS. 3A and 3B, the carrier 15 comprises four bays which are defined by a rectilinear frame. The carrier 15 has four corner posts 29, arranged in a rectangle using four upper connecting girders 30 and four lower connecting girders 31. On two opposite sides of the carrier 15 and between vertical posts 32 and in the center of the ends, at an intermediate level, are four longitudinal rails 33 defining four compartments or bays for slidably receiving seismic receiver units 14 like drawers in a chest. In other embodiments of the carrier, a lower or higher number of compartments may be provided. On the top of the corner posts 29 are pad-eyes 34 for connection of a carrier line. Each bay has a flat receiver support plate 57 at its bottom. This plate helps support the carrier on a soft muddy seabed. The four bays, in this example, are accessible from two opposite sides (see FIG. 3B). The frame posts 29 facilitate stacking, movement by forklift trucks when loading and unloading the vessel, and easy deck handling.

Seismic Equipment

The main concern regarding the OBS receiver units 14 for prolonged use in a deep water is the electrical power supply, the lifetime of the batteries as well as with a proper container solution for the batteries. Various solutions have been considered. At present, the most promising solution is to use hollow glass spheres or cylinders filled with long lifetime alkaline batteries. Such a solution may give an operational lifetime of as much as five months. This concept is a modification of proven technology used in conventional deep-water OBS surveys. The hydrophone and transducers would be modified for the appropriate water depths.

SeaBed Geophysical of Trondheim, Norway provides 3D acquisition and processing services to the petroleum industry. Two of the principals in SeaBed, Eivind Berg and Bjornar Svenning, played principal roles in the development of Statoil's SUMIC (SUbsea seisMIC) node technology that was employed to acquire the first image of Statoil's gas-shrouded Tommeliten Field in 1993. Their work and that of their colleague James Martin kicked off the current multi-component ocean bottom seismic activity of the last eight years. In 1999 the Society of Exploration Geophysicists awarded the Kaufmann Gold Medal to Berg, Svenning and Martin in recognition of their achievement.

Figure 5:
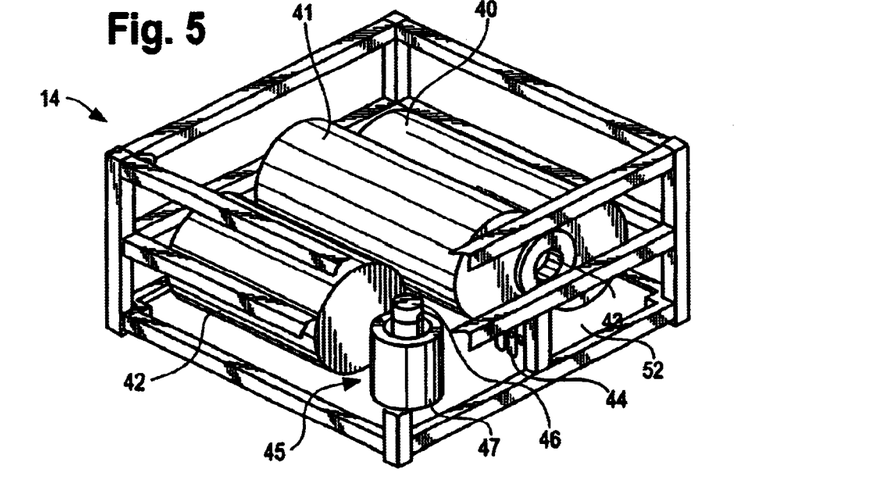
FIG. 5. is a perspective drawing of a seismic receiver unit according to the invention, with cylindrical containers, and with a partial section to show a sensor unit arranged in its storage position.
Figure 8:
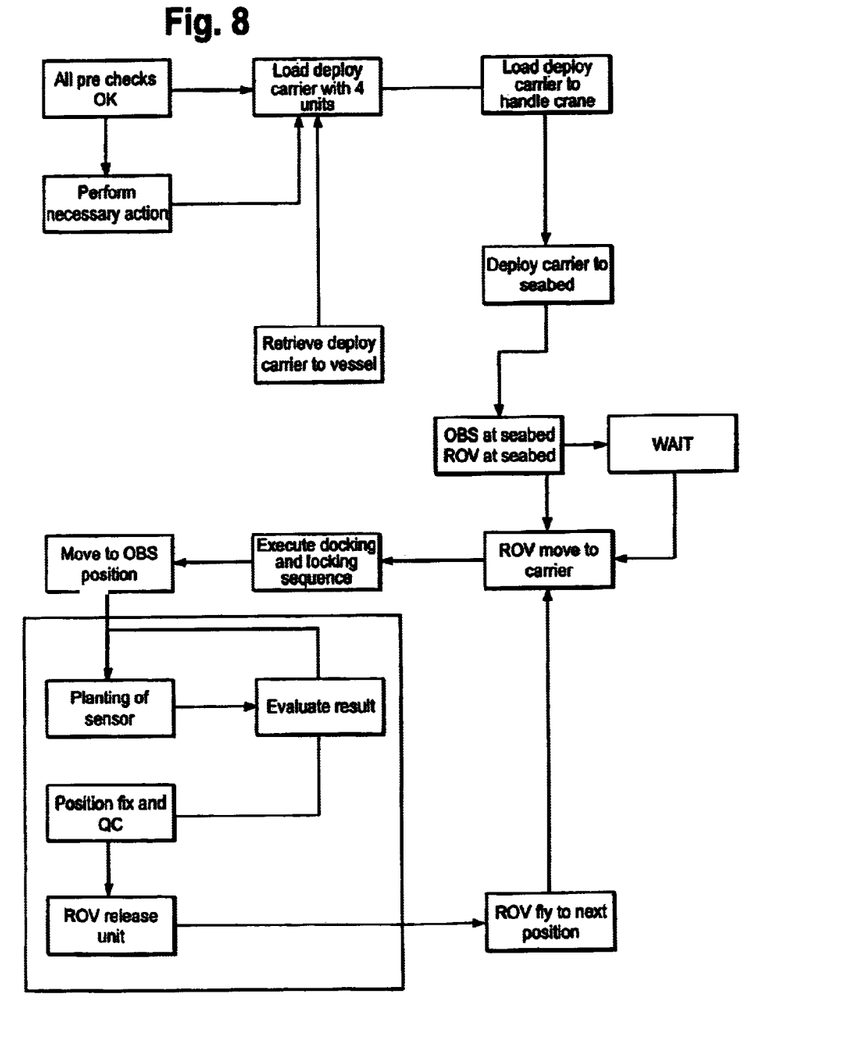
FIG. 8 is a block diagram depicting the deployment of the seismic receivers.

FIG. 5 shows one example of an OBS receiver unit 14 used by Seabed. The receiver unit is shown prior to insertion into the bays of the carrier 15 of FIGS. 3A and 3B. The structure of this unit is similar to that of the carrier of FIGS. 3A and 3B with four corner posts and horizontal girders. Inside the box-shaped interior of the grid structure, the following elements are provided: three cylindrical containers 40, 41, 42 for receiving batteries, electronic equipment and related auxiliaries, an ROV tool receiving bushing 43 (with a collar 50), a locking means 44 (which means will be further described with reference to FIGS. 8A and 8B) arranged interior to the ROV tool receiving bushing 43, and a sensor unit 45 for receiving seismic waves from the seabed. The sensor unit 45 is connected to the electronic equipment of the containers 40, 41 and 42 by a cable (not visible). The sensor unit 45 comprises a lower collar 46 to penetrate the seabed in its operating position. A generally flat plate at the bottom end of the unit helps the unit from sinking too deep into a soft seabed.

Figure 7:
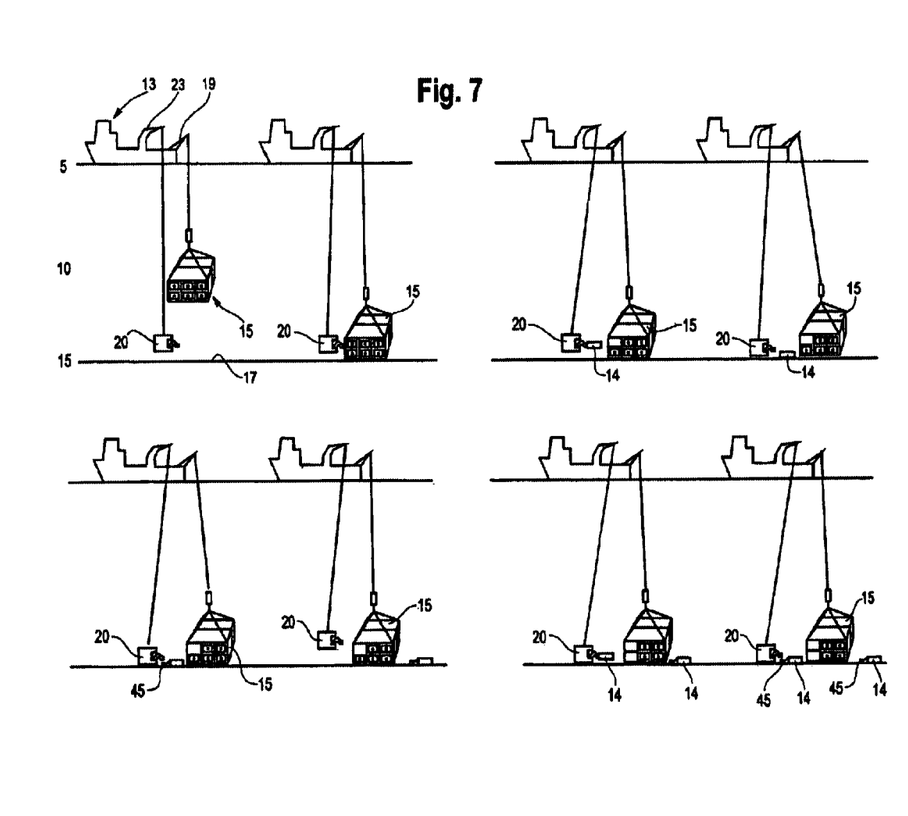
FIG. 7 schematically illustrates eight steps of one method of using the carrier system to deploy autonomous receiver units on the seabed.

One feature of the Seabed system is that, after a receiver unit 14 is placed onto the seafloor, a ROV grasps an operating handle 47 and removes (see FIG. 7, step 5) the sensor unit 45 from the unit frame and plants it vertically and a short (about 1 meter) distance away from the frame. This method isolates the sensor from mechanical and electrical noise. Only a short flexible cable connects the two. This approach also produces higher vector fidelity than those systems that simply lay sensors on the seafloor and use gravity to provide the coupling force. Seabed receiver units 14 are also referred to as "CASE" (CAbleless SEismic) units.

Figure 4:
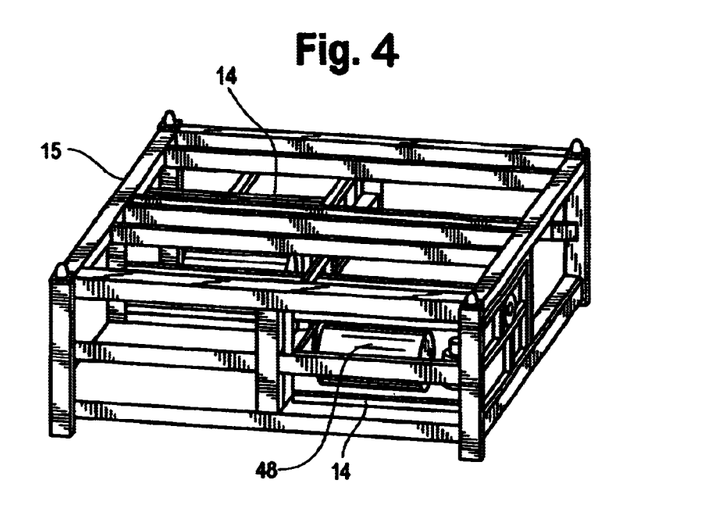
FIG. 4 shows the carrier of FIGS. 3A and 3B with two autonomous receiver units partially installed.

FIG. 4 shows the carrier 15 of FIGS. 3A and 3B with two seismic receiver units 14 of FIG. 5 arranged in diagonally opposite positions.

Figure 6A:
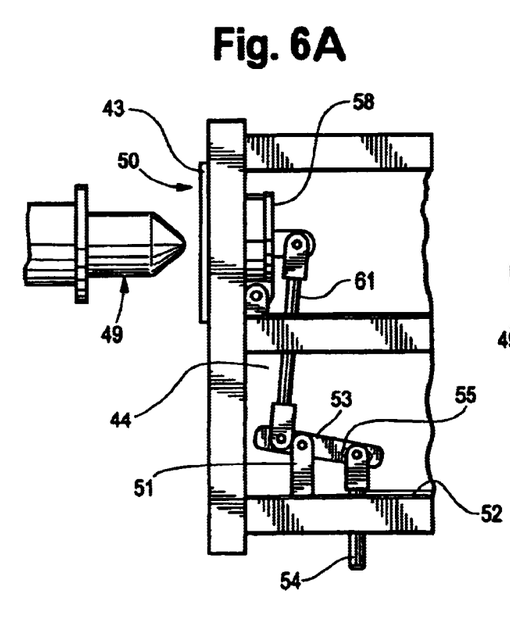
FIGS. 6A and 6B are partial side elevational views of the carrier of FIG. 4 illustrating one embodiment of the latching system.
Figure 6B:
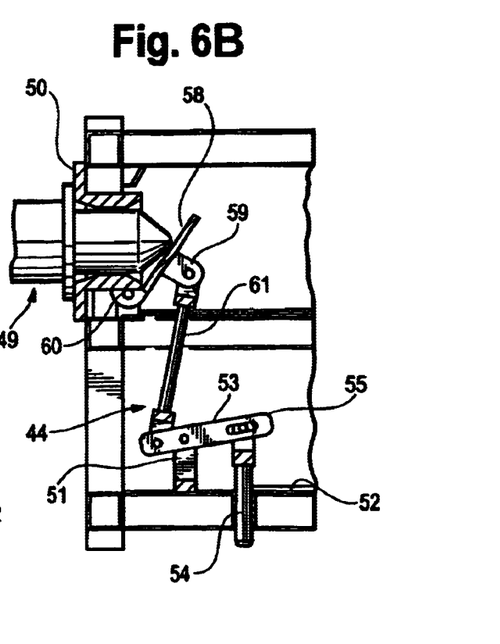

FIGS. 6A and 6B show the elements of the locking means 44 in an operating position and in a released position respectively. A ROV tool 49 is shown in a remote position in FIG. 8A, and aligned for insertion into the ROV tool receiving bushing 43.

The locking means 44 comprises a lower, upright bracket 51 located on the bottom 52 of the seismic receiver unit 14, a pivoted lever arm 53 linked at one end to the top of the bracket and linked at the opposite end to a downward oriented locking pin 54 by a slot 55. The locking pin 54 is arranged to engage with a mating recess or opening 57A (FIG. 3A) in a bottom plate 57 of the carrier to lock the seismic receiver unit 14 in the carrier 15.

The other end of the pivoted lever arm 53 is linked to an upright activating rod 61, the upper end of which is linked to a hinged activating dish 58 arranged to pivot at its lower end between a position close to the inner end of the bushing 43 (FIG. 6A, in its locking position), and a position engaged by the ROV tool 49 (FIG. 6B, in its released position). The activating dish 58 has, on its inner side, a central lug 59 linked to the upper end of the activating rod 61, and has, at its outer and lower side, a lug 60 linked to the rigid frame of the seismic receiver 14. Other locking or latching mechanisms are readily suggested to those skilled in the art.

C. Operations

Mobilization takes place at dock locations. Due to the complexity of the systems and amount of equipment, qualified labor must be used. An on-site supervisor should be present at all times during the mobilization period. Installation and hook up of high-pressure air systems will follow recognized procedures. If docking is required, the ship owner will be in charge of the operations.

During positioning of carriers 15 and deck equipment, care must be taken to ensure that escape routes, emergency exits, fire hydrants, life saving appliances are not blocked or made inaccessible due to deck arrangement. A complete plan for rigging, including deck layout and safe job analysis should be worked out prior to start up of mobilization.

The locking and fixing of temporary cargo may be done by welding it to the deck. If required, support struts, beams and plates should be arranged to achieve proper and secure rigging. If fixing cannot be done by welding, relocation should be considered before chain, rope or other non-rigid methods are used. If such solutions are chosen, approval may be needed from responsible agencies. Proper authorities should certify all welding and installed lifting appliances.

The ROV operations area is decided by ROV operators' equipment and procedures. Details for such are well understood by those who are skilled in the art. One small deck container will be located in the vicinity of the ROV deployment area and will function as an OBS unit preparation station.

Preferably, a plurality of carriers 15 (see FIGS. 1 and 7) is used to simultaneously lower a large group of OBS units close to the seabed. This allows the ROV to spend most of its operational time at deep depths performing useful work.

The carrier 15 is raised and lowered by a line from a carrier-operating crane 19 arranged at the rear end of the operating vessel 13. The ROV 20 (control container 21 not shown for simplicity) is suspended by a line from the ROV launch and recovery crane 23 on the operating vessel 13.

1. Underwater Positioning of the Seismic Receiver Units

For geographic positioning of the receivers 14, two systems may be used; USBL and LUSBL. Both are capable of positioning the OBS units within an accuracy of 5 to 10 m. However, the LUSBL system is the most accurate and preferred solution, since it has a potential accuracy of less than 3 m. This system will also shorten the operational time consumed by the deployment phase. A large omni-directional source system is suggested with a peak-to-peak pressure of 105 bar meters. The source size is related to the large offsets needed and the great depth of the target area.

2. Seismic Survey Area and Configuration

In one embodiment, the operational method for deployment and recovery made use of a lightweight OBS unit 14 and the use of a ROV from a Dynamic Positioning RSV vessel. Two vessels are used: one source vessel 12 and one handling vessel 13. In addition, it may be cost efficient to introduce a second handling vessel during initial deployment phase. The estimated time for deployment for each OBS receiver unit is less than one half hour. Time for recovery will be approximately the same. Laying out 900 units in two deployment phases, with 450 nodes in each, is considered to be a cost-time effective option.

Once the carrier 15 is at the correct depth (see Step 2 of FIG. 7), the ROV extends its arm into the carrier to release the latch 44 and support one OBS unit. Next (see Step 3), that OBS unit 14 is extracted from the carrier bay and planted on the seabed (see Step 4). Thereafter (see Step 5), in the case of the OBS units made by Seabed Geophysical, the ROV plants the seismic sensor 45 in the seabed. Finally, the ROV returns to the carrier 15 to repeat the cycle (see Steps 6 through 8) until the carrier is emptied.

Figure 9:
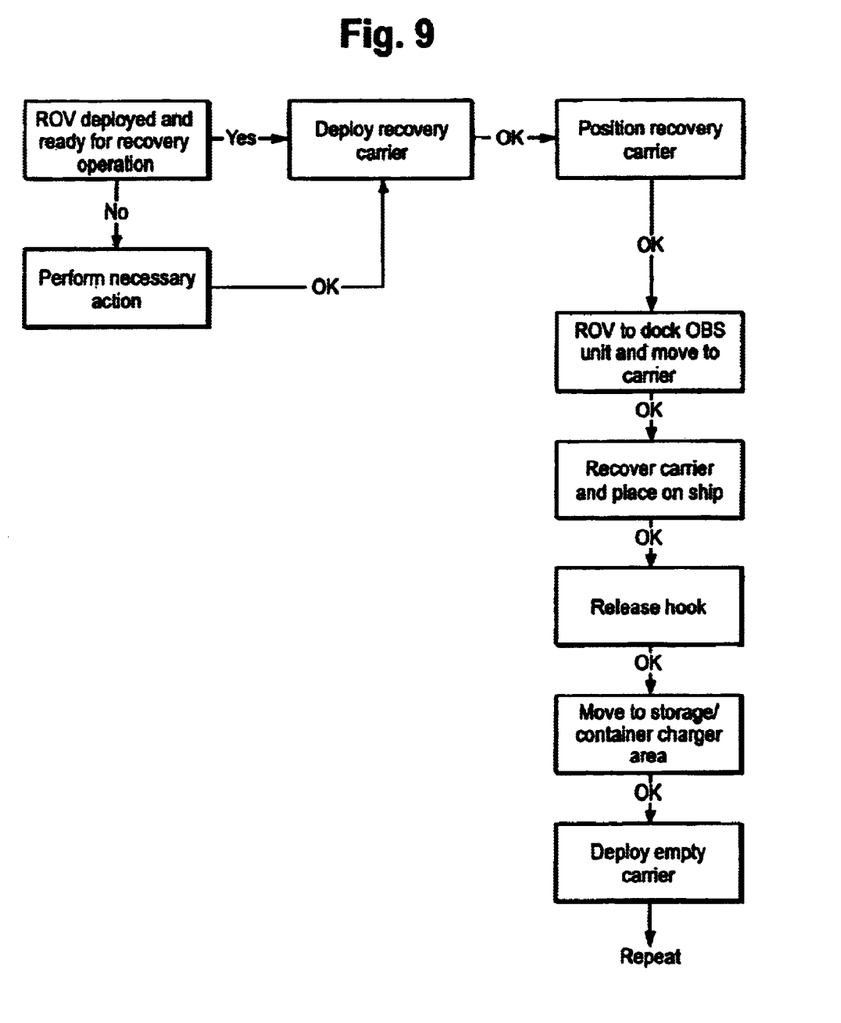
FIG. 9 is a block diagram depicting the recovery of the seismic receivers.

Recovery (see FIG. 9) of the OBS units from the seabed reverses the steps previously described. When the ROV arm withdraws from the carrier 15, the OBS unit 14 is secured to the carrier frame by the latching means 44.

Geotechnical investigations have showed that the OBS units 14 can be both planted and well coupled to the sea bottom of a survey area in the GOM. This is based on comparisons from previous tests in the North Sea as well as several fjord tests with similar geotechnical sea bottom conditions as that of the GOM. That study also concluded:

(i) With a receiver spacing of 500 m, a survey area covered by 900 receivers and having shot offset of 10 km, should be able to image the reservoir target properly using shots fired every 50 m within the shooting grid.

(ii) P-wave and S-wave data will be obtained from the reservoir target for a wide range of azimuths and offsets.

(iii) Based on the received background data, the OBS receiver units should achieve good coupling using a skirted receiver for all sea bottom conditions (iv) The OBS units are assumed to be well planted in areas where the dip is less than 15 to 20 degrees. Even if 120 locations are in steeply sloping areas, only thirty-five units, or four percent (4%) of the planned number of units, would need to be moved more than 50 m away from the pre-defined position.

(v) Noise generated by rig activity is expected to have only local effect on the recorded data (i.e., within a radius of 2 km).

(vi) Long life alkaline batteries and recording electronics in a glass water-tight housing is a good choice.

(vii) For accurate positioning of the units, a system using LUSBL has a potential positioning accuracy of 3 m.

(viii) A large omni-directional source with a peak-to peak pressure of approximately 105 bar meters was suggested.

(ix) Long life batteries provide new possibilities in making the operation more efficient and less time consuming.

(x) The recording equipment should have no impact on the seabed environment, no explosion danger during recovery and no explosive gases from battery charges.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made in the shape, materials, size and arrangement of parts. For example, the drawings illustrate a rectilinear box-like frame for a receiver unit made from a plurality of hollow metal bars having a square cross section. Another embodiment uses a structural material made from a polyurethane elastomer that is molded or cast in two symmetrical halves that are bolted together to form the framework of the OBS unit. Moreover, equivalent elements may be substituted for those illustrated and described. Parts may be reversed and certain features of the invention may be used independently of other features of the invention. As another example, the foregoing description describes only one receiver coupled to the ROV at any time. Another arrangement would have the ROV carry multiple receiver units for deployment one at a time. It may also be advantageous to deploy a cache of receivers on the seafloor and to use an autonomous submarine, which is programmed to retrieve receivers from the cache without continuous human monitoring. As a final example, there may be locations on the seabed that are especially soft and weak. A carrier design (like that of FIGS. 3 and 4), that uses a bottom plate 57 located very close to the bottom of the carrier bays, may not prevent the lower bays from sinking too deep. One solution is to extend the legs and the bottom plate below the receiver bays. This would resist sinking too far into the seabed such that the ROV may be prevented from safely accessing the receivers. Thus, it will be appreciated that various modifications, alternatives, variations, and changes may be made without departing from the spirit and scope of the invention as defined in the appended claims. It is, of course, intended to cover by the appended claims all such modifications involved within the scope of the claims.

We claim:

1. A method of seismic exploration, comprising the steps of:
   (a) loading a plurality of seismic data receivers in a carrier located on a ship floating on the surface of a body of water, each carrier comprising a plurality of compartments that are adapted to removably hold said seismic data receivers, each of said receivers having a seismic sensor, having a memory for recording compression and shear waves emanating from the seabed, and having a switch for activating said memory;
   (b) lowering said carrier into the water and to a depth near the seabed by using a crane on said ship;
   (c) using a ROV located in the water and tethered to said ship to unload said data receivers from said carrier, to deposit each on the seabed, and to position said sensor along a survey line; and
   (d) remotely operating said switches to activate said memories and begin recording the response of the seabed to sound injected into the water from a vessel floating in or on said body of water.

2. The method of claim 1, wherein said receivers comprise:
   (a) a frame having means for removably coupling to said ROV; and
   (b) plate means for helping said frame from sinking into said seabed.

3. The method of claim 1, further including the steps of:
   (e) using said ROV to move said data receivers from the seabed to said carrier; and
   (f) using said crane to lift said carrier from the water.

4. The method of claim 3, wherein each compartment has a pin that fits in an aperture in a receiver, and where said pin moves in and out of said aperture in response to contact with said ROV.

5. Ocean bottom survey apparatus, comprising:
   (a) a carrier comprising at least eight of generally open compartments that are arranged side-by-side and back-to-back on two levels;
   (b) a frame adapted to be removable inserted in one of said compartments;
   (c) at least one pressure vessel carried by said frame, said vessel comprising two mating units and a seal between said units for forming a water-tight joint between the interior and the exterior of said vessel at least to a depth of 4000 feet;
   (d) a plurality of batteries located within the interior of said vessel;
   (e) a seismic sensor of shear waves and compression waves that is adapted to be in acoustic communication with the seabed and electrically connected to a memory;

(f) a switch that operatively connects said memory to said batteries;

(g) a control module carried by said frame for operating said switch in response to a signal transmitted into the water; and (h) a coupling carried by said frame and adapted to be removably connected to an arm extending from an ROV.

6. The apparatus of claim 5, wherein said vessel comprises two hollow hemispheres.

7. The apparatus of claim 5, wherein said carrier has a front side and a back side back, and each side comprises two rows of compartments and two columns of compartments.

8. The apparatus of claim 5, wherein said pressure vessel is generally in the shape of a cylinder.

9. The apparatus of claim 5, further including means carried by said carrier for removably locking a frame in each compartment.

* * * * *